United States Patent
Wakeford et al.

(10) Patent No.: US 9,539,497 B1
(45) Date of Patent: Jan. 10, 2017

(54) DISPLAY OF A GAME THROUGH A PRIMARY AND MOBILE DISPLAY WITH INDIVIDUALIZED AUDIO THROUGH THE MOBILE DEVICE

(71) Applicant: Kabam, Inc., San Francisco, CA (US)

(72) Inventors: Kent Wakeford, Hillsborough, CA (US); Clifford J. Harrington, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 111 days.

(21) Appl. No.: 13/889,205

(22) Filed: May 7, 2013

(51) Int. Cl.
*A63F 13/00* (2014.01)

(52) U.S. Cl.
CPC .................... *A63F 13/00* (2013.01)

(58) Field of Classification Search
CPC ........................................ A63F 13/00
USPC ............................................... 463/31
See application file for complete search history.

(56) References Cited

U.S. PATENT DOCUMENTS

| | | | | |
|---|---|---|---|---|
| 6,567,984 B1 | 5/2003 | Allport | | 725/110 |
| 6,878,067 B2 * | 4/2005 | Blanco | | A63F 13/10 463/35 |
| 7,047,030 B2 | 5/2006 | Forsyth | | 455/518 |
| 7,194,754 B2 | 3/2007 | Tomsen et al. | | 725/60 |
| 7,580,005 B1 | 8/2009 | Palin | | |
| 7,637,813 B2 | 12/2009 | Katayama et al. | | 463/31 |
| 8,156,004 B2 | 4/2012 | Wajihuddin | | 705/14.5 |
| 8,226,476 B2 | 7/2012 | Haltovsky et al. | | 463/30 |
| 8,270,641 B1 | 9/2012 | Greenberg | | 381/306 |
| 8,282,490 B2 | 10/2012 | Arezina et al. | | 463/42 |
| 2002/0110246 A1 * | 8/2002 | Gosior et al. | | 381/2 |
| 2003/0013527 A1 * | 1/2003 | Rowe | | G07F 17/32 463/42 |
| 2003/0216181 A1 | 11/2003 | Danieli et al. | | 463/39 |
| 2006/0111188 A1 * | 5/2006 | Winkler | | 463/42 |
| 2007/0021192 A1 * | 1/2007 | Tamimoto et al. | | 463/25 |

(Continued)

OTHER PUBLICATIONS

Wii U Official Site—Built in Software, Nintendo, http://www.nintendo.com/wiiu/built-in-software/*/eshop, printed Feb. 16, 2013, 5 pages.

(Continued)

*Primary Examiner* — David L Lewis
*Assistant Examiner* — Shauna-Kay Hall
(74) *Attorney, Agent, or Firm* — Sheppard Mullin Richter & Hampton LLP

(57) ABSTRACT

The disclosure relates to systems and methods for communicating a primary display comprising information that facilitates visual presentation of a view of a game space and general audio to a primary client device and facilitating communication of individualized audio through a secondary client device such as a user's smartphone. The system may include a computing device that allows a user to play a video game through a primary client device, and send or receive individualized audio through a secondary client device while playing the video game. The system may include a set top box or other media device configured to provide general audio to a display device and individualized audio through a user's secondary client device. The individualized audio may include audio tracks, voice communications (e.g., verbal utterances from a user to another user), and/or other sounds intended for a particular user and/or group of users.

18 Claims, 6 Drawing Sheets

(56) References Cited

U.S. PATENT DOCUMENTS

| | | |
|---|---|---|
| 2007/0087831 A1 | 4/2007 | Van Luchene |
| 2007/0265073 A1* | 11/2007 | Novi .................. A63F 13/12 463/35 |
| 2008/0026849 A1 | 1/2008 | Bird .............................. 463/42 |
| 2008/0140536 A1 | 6/2008 | Ruiz Tejedor |
| 2008/0214273 A1* | 9/2008 | Snoddy et al. ................. 463/19 |
| 2009/0098940 A1* | 4/2009 | Sangberg .............. A63F 13/12 463/42 |
| 2009/0264190 A1* | 10/2009 | Davis ................ G07F 17/3227 463/26 |
| 2010/0056280 A1 | 3/2010 | Langan et al. ................. 463/42 |
| 2010/0069158 A1 | 3/2010 | Kim |
| 2010/0099471 A1 | 4/2010 | Feeney et al. .................... 463/1 |
| 2010/0178973 A1 | 7/2010 | Snoddy et al. ................. 463/19 |
| 2010/0185721 A1 | 7/2010 | Merrifield |
| 2010/0267448 A1 | 10/2010 | Snoddy et al. ................. 463/30 |
| 2011/0092271 A1 | 4/2011 | Nguyen .......................... 463/25 |
| 2011/0143835 A1 | 6/2011 | Sizelove ........................ 463/31 |
| 2012/0038742 A1 | 2/2012 | Robinson et al. ......... 348/14.16 |
| 2012/0038827 A1* | 2/2012 | Davis ............................ 348/588 |
| 2012/0059795 A1 | 3/2012 | Hersh et al. ................... 707/628 |
| 2012/0220354 A1 | 8/2012 | Haltovsky |
| 2012/0249591 A1 | 10/2012 | Maciocci et al. ............. 345/633 |
| 2012/0270646 A1* | 10/2012 | Walker et al. .................. 463/29 |
| 2012/0304584 A1 | 12/2012 | Pan |
| 2013/0046781 A1* | 2/2013 | Frankel .................. G06Q 30/02 707/769 |
| 2013/0053144 A1* | 2/2013 | Nicely ................ G07F 17/3227 463/35 |
| 2013/0072308 A1 | 3/2013 | Peck |
| 2013/0246942 A1 | 9/2013 | Merrifield |
| 2013/0254680 A1 | 9/2013 | Buhr et al. ..................... 715/753 |
| 2014/0176534 A1 | 6/2014 | Vignocchi |

OTHER PUBLICATIONS

AMD Eyefinity Technology, http://www.amd.com/us/products/technologies/amd-eyefinity-technology/pages/eyefinity.a . . . , printed Feb. 13, 2013, 1 page.

* cited by examiner

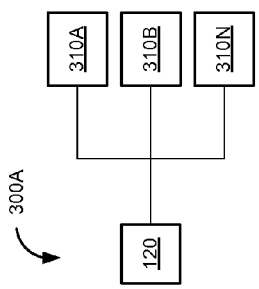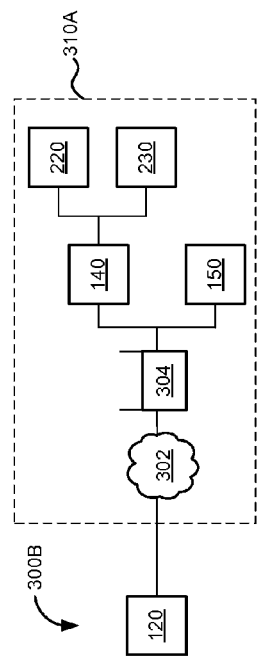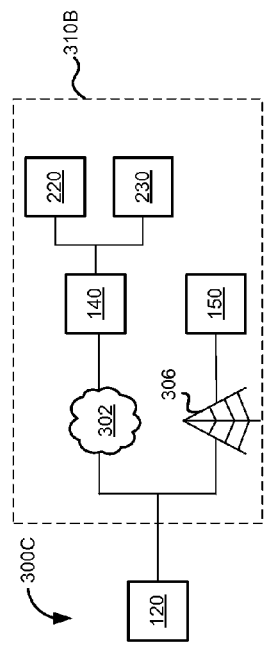

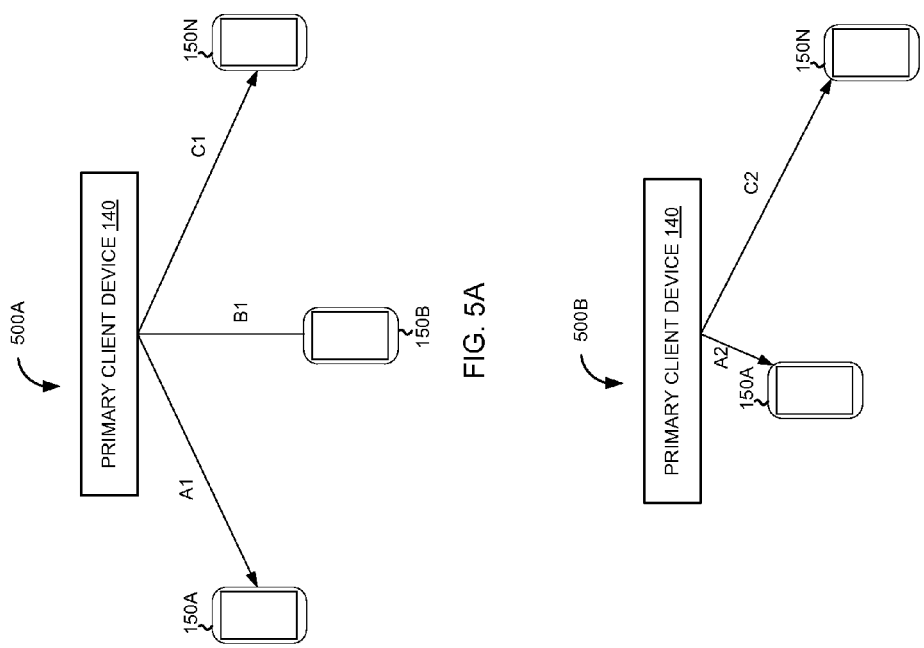

DISPLAY OF A GAME THROUGH A PRIMARY AND MOBILE DISPLAY WITH INDIVIDUALIZED AUDIO THROUGH THE MOBILE DEVICE

FIELD OF THE INVENTION

The disclosure relates to systems and methods for communicating a primary display comprising information that facilitates visual presentation of a view of a game space and general audio to a primary client device and facilitating communication of individualized audio through a secondary client device such as a user's smartphone.

BACKGROUND OF THE INVENTION

Some conventional game allow for dual screen gameplay. However, while extending game play to two separate displays (the primary display device and a secondary display device) may enhance certain aspects of game play, users may not feel truly immersed in gameplay in part because they typically only look at one display at a time.

SUMMARY OF THE INVENTION

The disclosure relates to systems and methods for communicating a primary display comprising information that facilitates visual presentation of a view of a game space and general audio to a primary client device and facilitating communication of individualized audio through a secondary client device such as a user's smartphone. The system may include a computing device that allows a user to play a video game or otherwise interact with a virtual environment through a primary client device, and send or receive individualized audio through a secondary client device while playing the video game using the primary client device. The system may include a set top box or other media device configured to provide general audio to a display device and individualized audio through a user's secondary client device. The individualized audio may include audio tracks, voice communications (e.g., verbal utterances from a user to another user), and/or other sounds intended for a particular user and/or group of users.

In some embodiments, the computing device may include one or more processors configured to execute one or more modules such as a registration module, a coordination module, a primary display module, a secondary display module, an individualized audio module, a device configuration module, and/or other modules.

In some embodiments, the registration module may be configured to register a user with the system. For example, the registration module may obtain user information such as a name, age, game handle (e.g., virtual name), credential information (e.g., username, password, keys), and/or other information that describes the user. To facilitate use of the secondary client device, the registration module may obtain an identification of the secondary client device.

In some embodiments, the coordination module may be configured to coordinate the activities of the primary display module and secondary display module such that gameplay and individualized audio communicated during gameplay are associated with the given user playing the game. For example, the coordination module may receive a logon, device identifier, and/or other identifying information from the user via the primary client device and/or the secondary client device. In this manner, a user may control one or more graphical objects within the game space through the primary client device and send/receive individualized audio through the secondary client device.

The coordination module may be configured to manage communication between the primary display module and primary client device for communicating a primary display generated by the primary display module. Likewise, the coordination module may manage communication between the secondary display module and the secondary client device for communicating a secondary display generated by the secondary display module and individualized audio specifically intended for a user of the secondary client device.

In some embodiments, the primary display module may be configured to communicate information that facilitates visual presentation of a view of a game space to the user on the primary client device. Responsive to the communicated information from the primary display module, the primary client device may render the visual presentation of the game space such that the user can play the game.

In some embodiments, the secondary display module may be configured to identify a particular user, such as a user for which individualized audio is intended. The secondary display module may obtain the individualized audio such as from the individualized audio module. The secondary display module may identify a secondary client device used by the particular use and communicate the individualized audio to the identified secondary client device. In some embodiments, the secondary display module may communicate secondary display information that includes a secondary visualization of some aspect of the game. The secondary visualization may include, for example, portions or all of the view of the game space, an individualized view of the game space (e.g., different from the view of the game space from the primary display module), and/or other visualization information.

In some embodiments, the individualized audio module may be configured to generate individualized audio intended for a particular user. The individualized audio module may generate the individualized audio based on user-specific information such as a game-related event related to the particular user (e.g., user actions in the game space), voice or other communications directed to the particular user such as from another user, information that is directed to a group of users of which the user is a member, a user's virtual location in the game space, and/or other information that is specific to the user. For example, the device configuration module facilitates individualized audio to secondary client devices to provide individualized audio to simulate the game space, where different virtual characters in a game space may experience different virtual audio based on their relative position in the game space.

In some embodiments, the individualized audio may provide an alert to the particular user that informs the user of an event of interest to the user. For example, the alert may be related to a low virtual inventory level, a battle status alert, and/or other types of alerts that inform the user of an event that may be occurring in relation the primary display.

In some embodiments, the individualized audio module may facilitate individualized audio by mediating or otherwise facilitating communications directly between secondary client devices. In this manner, individualized audio module facilitates individualized audio between secondary client devices without direct involvement of the computing device. For example, individualized audio module may provide a first secondary client device with an identifier (e.g., phone number, device identifier, etc.) of a second secondary client device so that a user of the first secondary client device may communicate with a user of the second secondary client device.

In some embodiments, the device configuration module may be configured to configure relative positions and numbers of secondary client devices with respect to one another and/or a primary client device. In these embodiments, the device configuration module may facilitate individualized audio based on numbers and/or relative positioning of the secondary and/or primary client devices. For example, the device configuration module facilitates individualized audio to secondary client devices to act as separate audio channels for rich audio in game or other media environment, where each audio channel is based on the positioning of a corresponding mobile device or other secondary client device.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3A illustrates a block diagram of multiple architectures for interacting with a computing device, according to an embodiment of the invention.

FIG. 3B illustrates a block diagram of a first particular architecture for interacting with the computing device, according to an embodiment of the invention.

FIG. 3C illustrates a block diagram of a second particular architecture for interacting with the computing device, according to an embodiment of the invention.

FIG. 5A illustrates an example of a configuration of secondary client devices in relation to a primary client device, according to an embodiment of the invention.

FIG. 5B illustrates an example of a configuration of secondary client devices in relation to a primary client device, according to an embodiment of the invention.

DETAILED DESCRIPTION OF THE INVENTION

Figure 1:
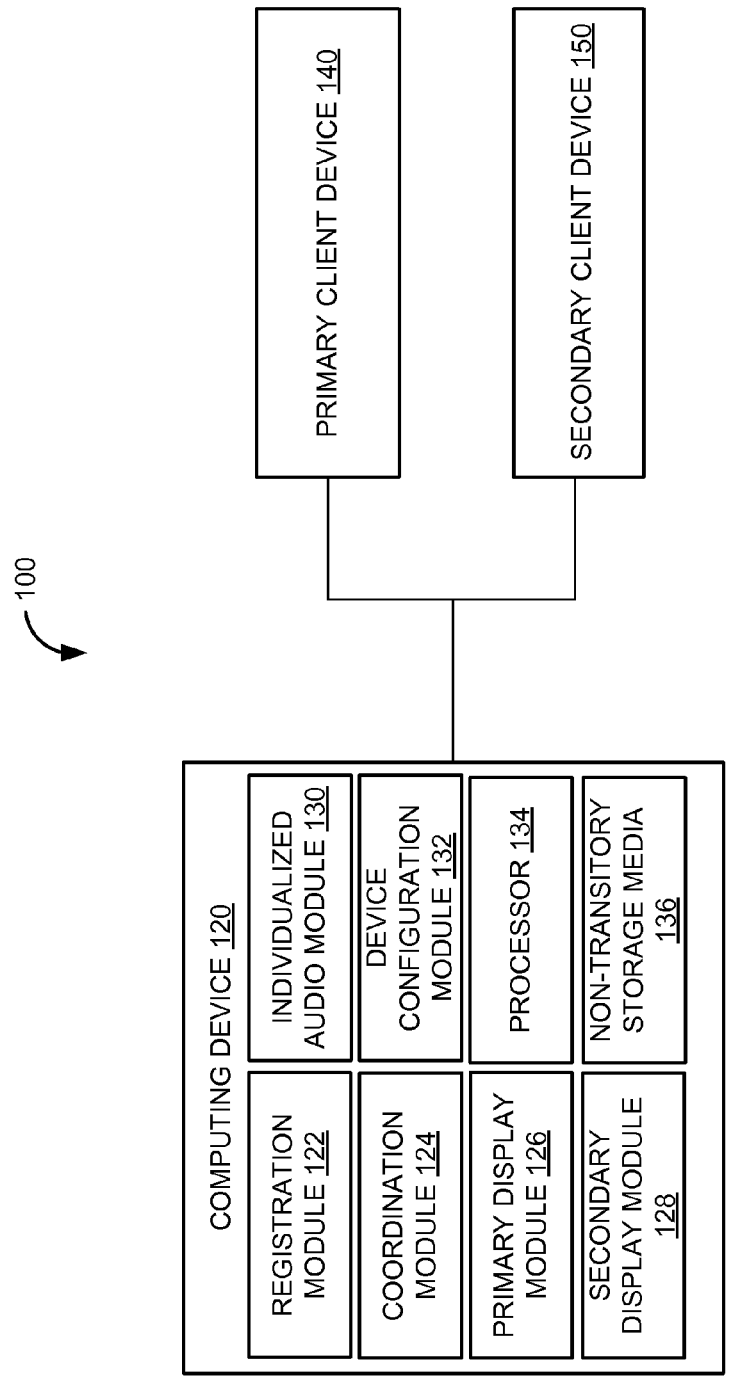
FIG. 1 illustrates a system for providing a primary display that includes a game space and a secondary display that facilitates communication of individualized audio while the game space is displayed via the primary display, according to an embodiment of the invention.

FIG. 1 illustrates a system 100 for providing a primary display that includes a game space and a secondary display that facilitates communication of individualized audio while the game space is displayed via the primary display, according to an embodiment of the invention. The individualized audio may include audio tracks, voice communications (e.g., verbal utterances from a user to another user), and/or other sounds intended for a particular user and/or group of users.

As used herein, a "user" may include a game player that may be represented by an avatar or other graphical representation in the game space and may be identified by a user handle or other identifier.

System 100 may include a computing device 120, a primary client device 140, a secondary client device 150, and/or other components. Although only a single computing device 120, a single primary client device 140, and a single secondary client device 150 is illustrated in FIG. 1, other numbers of the foregoing devices may be used and other configurations of system 100 may be used, examples of which are illustrated in FIGS. 3A-3C and FIGS. 4A and 4B.

Computing device 120 may include one or more processors 134 configured to execute one or more modules such as a registration module 122, a coordination module 124, a primary display module 126, a secondary display module 128, an individualized audio module 130, a device configuration module 132, and/or other modules.

In some embodiments, registration module 122 may be configured to register a user with the system. For example, registration module 122 may obtain user information such as a name, age, game handle (e.g., virtual name), credential information (e.g., username, password, keys), and/or other information that describes the user.

To facilitate use of secondary client device 150, registration module 122 may obtain an identification of the secondary client device. For example, in embodiments where the secondary client device 150 used by a user to send and/or receive individualized audio includes the user's mobile device, registration module 122 may obtain an identification of the mobile device such as a Media Access Control address.

In some embodiments, coordination module 124 may be configured to coordinate the activities of primary display module 126 and secondary display module 128. For example, coordination module 124 may receive a logon, device identifier, and/or other identifying information from the user via primary client device 140 and/or secondary client device 150.

Coordination module 124 may be configured to manage communication between primary display module 126 and primary client device 140 for communicating a primary display generated by the primary display module. Likewise, coordination module 124 may manage communication between secondary display module 128 and secondary client device 150 for communicating a secondary display generated by the secondary display module.

Coordination module 124 may recognize that the user wishes to initiate a gameplay session using primary client device 140 and secondary client device 150 based on the identifying information received from primary client device 140 and secondary client device 150. Initiating the gameplay session may include joining an existing online game (e.g., a multi-user online game that operates whether or not a particular user is logged onto the game), initiating a new online game, hosting an online game, initiating a local game, and/or otherwise allowing the user to begin playing the game.

Accordingly, coordination module 124 may initiate and coordinate a gameplay session that is associated with a primary display communicated to primary client device 140 and a secondary display communicated to secondary client device 150. For example, a gameplay session identifier may be associated with identities of a user, primary client device 140, and/or secondary client device 150 such that information that facilitates visual presentation of a view of a game space may be communicated to primary client device 140 and individualized audio may be communicated to secondary client device 150 during gameplay. By doing so, coordination module 124 may ensure that computing device 120 is able to coordinate gameplay occurring via a primary display communicated to primary client device 140 and individualized audio being communicated to secondary client device 150.

Coordination of primary client device 140 and the secondary client device 150 may occur in various ways. By way of example only, the user may logon to a gameplay session via both primary client device 140 and secondary client device 150. For example, primary client device 140 may include a computing device used to connect to computing device 120 for playing an online game.

In some embodiments, primary client device 140 and/or secondary client device 150 may be pre-registered with the system, such as via registration module 122 such that computing device 120 may recognize either or both devices. For example, upon logging onto the system to start a gameplay session using primary client device 140, a connection with secondary client device 150 may automatically be established.

Primary display module 126 may be configured to communicate information that facilitates visual presentation of a view of a game space to the user on primary client device 140. Responsive to the communicated information from primary display module 126, primary client device 140 may render the visual presentation of the game space such that the user can play the game.

In some embodiments, primary display module 126 may communicate game events such as user inputs from primary client device 140, inputs from other users in a multi-user game, actions resulting from the inputs, and/or other game events to other modules of computing device 120, such as coordination module 124. In this manner, various modules of computing device 120 may be updated with current game events and act accordingly, as described herein.

In some embodiments, the individualized audio module 130 may be configured to generate individualized audio intended for a particular user. The individualized audio module 130 may generate the individualized audio based on user-specific information such as a game-related event related to the particular user (e.g., user actions in the game space), voice or other communications directed to the particular user such as from another user, information that is directed to a group of users of which the user is a member, a user's virtual location in the game space, and/or other information that is specific to the user. For example, the individualized audio module 130 facilitates individualized audio to secondary client devices to provide individualized audio to simulate the game space, where different virtual characters in a game space may experience different virtual audio based on their relative position in the game space.

In some embodiments, the individualized audio may provide an alert to the particular user that informs the user of an event of interest to the user. For example, the alert may be related to a low virtual inventory level, a battle status alert, and/or other types of alerts that inform the user of an event that may be occurring in relation the primary display.

In some embodiments, the individualized audio module 130 may facilitate individualized audio by mediating or otherwise facilitating communications directly between secondary client devices. In this manner, individualized audio module facilitates individualized audio between secondary client devices without direct involvement of the computing device. For example, individualized audio module 130 may provide a first secondary client device with an identifier (e.g., phone number, device identifier, etc.) of a second secondary client device so that a user of the first secondary client device may communicate with a user of the second secondary client device.

In some embodiments, the device configuration module 132 may be configured to configure relative positions and numbers of secondary client devices with respect to one another and/or a primary client device. In these embodiments, the device configuration module 132 may facilitate individualized audio based on numbers and/or relative positioning of the secondary and/or primary client devices. For example, the device configuration module 132 facilitates individualized audio to secondary client devices to act as separate audio channels for rich audio in game or other media environment, where each audio channel is based on the positioning of a corresponding mobile device or other secondary client device. Examples and configurations are illustrated in FIGS. 5A and 5B.

The primary display may be communicated to and displayed by a primary client device 140 and the secondary display may be communicated to and displayed by a secondary client device 150. Primary client device 140 may include a computing device, a monitor, an input device, and/or other devices that allow viewing and/or interaction with the game. Secondary client device may include a generally portable computing device such as a cellular device, a tablet computing device, and/or other generally portable computing device that is configured to send or receive individualized audio.

The components illustrated in FIG. 1 may be communicably coupled to one another via various communication links. The communication links may include wired or wireless connections. In some embodiments, the communication links may include a network connection that includes any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Primary client device 140 and secondary client device 150 may each include or be coupled to audio output devices (not illustrated in FIG. 1). For example, primary client device 140 may include an integrated speaker and/or be coupled to an external speaker that emits the general audio communicated from primary display module 126. Similarly, secondary client device 150 may include an integrated speaker and/or be coupled to an external speaker that emits the individualized audio from secondary display module 128.

Those having skill in the art will recognize that primary client device 140 and secondary client device 150 may each comprise one or more processors, one or more interfaces (to various peripheral devices or components), non-transitory storage media, and/or other components coupled via a bus. The non-transitory storage media, such as non-transitory storage media 136 of computing device 120 and non-transitory storage media of primary client device 140 (not illustrated) and non-transitory storage media of secondary client device 150 (not illustrated), may comprise random access memory (RAM), read only memory (ROM), or other memory. The memory may store computer-executable instructions to be executed by the processor as well as data that may be manipulated by the processor. The storage media may comprise floppy disks, hard disks, optical disks, tapes, or other storage media for storing computer-executable instructions and/or data.

Other system configurations using a secondary client device for a game may be used as well. For example, commonly owned and co-pending U.S. patent application Ser. No. 13/791,668, filed Mar. 8, 2013, entitled "SYSTEM AND METHOD FOR FACILITATING A GAME THROUGH A PRIMARY CLIENT DEVICE AND IN-GAME CONTENT PURCHASES THROUGH A MOBILE DEVICE," which is incorporated by reference in its entirety herein, describes, among other things, processing content purchases via a secondary client device while facilitating gameplay via a primary client device. Commonly owned and co-pending U.S. patent application Ser. No. 13/828,469, filed Mar. 14, 2013, entitled "SYSTEM AND METHOD FOR DISPLAYING A GAME USING A PRIMARY DISPLAY AND COMMUNICATING ALLIANCE INFORMATION AMONG ALLIANCE MEMBERS USING A SECONDARY DISPLAY," which is incorporated by reference in its entirety herein, describes, among other things, communicating alliance information via a secondary client device while facilitating gameplay via a primary client device.

Figure 2:
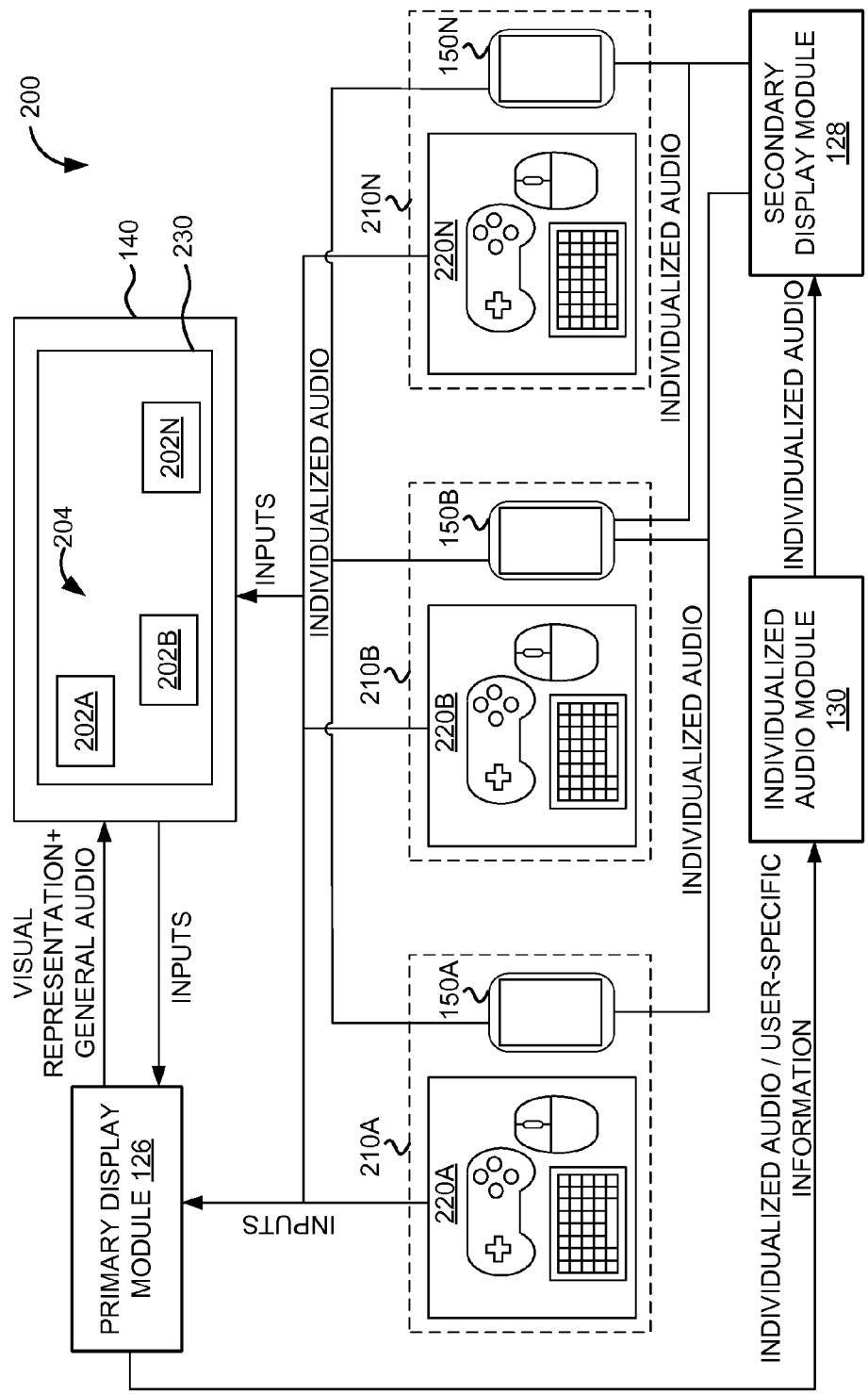
FIG. 2 illustrates an example of a block diagram showing data flows between various components for displaying a game using a primary display and facilitating individualized audio using a secondary display, according to an embodiment of the invention.

FIG. 2 illustrates an example of a block diagram 200 showing data flows between various components for displaying a game (and/or other media) using a primary display and facilitating individualized audio using a secondary display, according to an embodiment of the invention. As illustrated in FIG. 2, one or more input devices 220 (illustrated in FIG. 2 as input devices 220A, 220B, . . . , 220N) and one or more secondary client devices 150 (illustrated in FIG. 2 as secondary client devices 150A, 150B, . . . , 150N) may be operated by respective users 210 (illustrated in dashed boxes 210A, 210B, . . . , 210N). In some embodiments, as illustrated, users 210 may view and interact with game space 204 displayed on a display device 230 of primary client device 140. In some embodiments, users 210 may use their own respective primary client devices 140 to interact with game space 204.

In some embodiments, individual users may control or otherwise interact with one or more respective graphical objects 202 (illustrated in FIG. 2 objects 202A, 202B, . . . , 202N) visually represented in game space 204 of a game. For example, using input device 220A, user 210A may control graphical object 202A. Input signals from input devices 220 may be communicated to primary client device 140 and/or primary display module 126 via one or more wired or wireless communication links.

In some embodiments, primary display module 126 provides secondary client device 140 with a visual representation and general audio intended for users that receive the visual representation. For example, the visual representation may include a visual representation of the game space of a video game (and/or video from a media file) and the general audio may include audio from the game (and/or audio from a media file).

In some embodiments, primary display module 126 provides user-specific information and/or individualized audio to individualized audio module 130, which may generate the individualized audio based on such input from primary display module 126. For example, primary display module 126, while executing the instance of the game space, may generate user-specific information. The user-specific information may include, without limitation, input controls from users, events (e.g., battles, explosions, actions, etc.) occurring in the game related to the user, and/or other information that is user-specific or otherwise related to the user.

Individualized audio module 130 may generate the individualized audio based on the user-specific information and/or may directly receive the individualized audio from primary display module 126. In embodiments where individualized audio module 130 generates individualized audio based on user-specific information, individualized audio module 130 may perform a lookup on a lookup table stored at, for example, non-transitory storage media 136. The lookup table may include a mapping of audio files to user-specific information (e.g., events) that may be encountered during the game and related to a particular user.

In some embodiments, individualized audio module 130 may generate the individualized audio based on input from secondary client devices 150. In these embodiments, a first user of a first secondary client device 150 may provide audio intended for a second user of a second secondary client device 150. For example, the individualized audio may include a voice communication, a sound track (e.g., song to share), and/or other audio communicated from the first user and intended for the second user.

In some embodiments, individualized audio module 130 may facilitate communication of the individualized audio from the first secondary client device 150 to the second secondary client device 150 by mediating such communication via respective communication channels with each secondary client device. For example, individualized audio module 130 may receive the individualized audio from the first secondary client device 150 and provide the individualized audio to the second secondary client device 150 via respective communication channels used to communicate with each secondary client device, as described herein.

In some embodiments, individualized audio module 130 may facilitate communication of the individualized audio from the first secondary client device 150 to the second secondary client device 150 by providing one or both devices with a device identifier such as a phone number. An agent (e.g., a mobile application) operating on each secondary client device 150 may facilitate communication between the devices by leveraging native (e.g., built-in) communication capabilities (e.g., cellular service, multi-media messaging to convey audio, etc.) of each. In this manner, communication between secondary client devices may be facilitated without direct involvement of individualized audio module 130 (apart from provisioning of contact or other information to facilitate communication between the secondary client devices).

Individualized audio module 130 may generate the individualized audio based on user-specific information and/or individualized audio received from various other components (such as components of system 100) not illustrated in FIG. 2 as well.

Using a respective secondary client device 150, such as respective mobile devices, individual users 210 may be provided with the individualized audio while playing the game. For example, individualized audio module 130 may provide the individualized audio to secondary display module 128, which communicates the individualized audio to respective secondary client devices 150.

In some embodiments, secondary display module 128 provides the individualized audio based on identities of particular users participating in the game. In these embodiments, the individualized audio may be intended for particular users and/or may be related to audio that is associated with particular users such that secondary display module 128 provides the individualized audio during the game based on respective identities of users of corresponding secondary client devices 150.

In some embodiments, secondary display module 128 provides the individualized audio to particular secondary client devices 150 based on identities of corresponding secondary client devices 150. In these embodiments, the individualized audio may be intended for particular secondary client devices and/or may be related to audio that is associated with particular secondary client devices (e.g., for multi-channel sound implementations illustrated in FIGS. 5A and 5B).

FIG. 3A illustrates a block diagram 300A of multiple architectures for interacting with a computing device 120, according to an embodiment of the invention. As illustrated, computing device 120 may be communicably coupled to one or more architectures 310 (illustrated in FIG. 3A as architectures 310A, 310B, . . . , 310N) that may individually connect one or more users to computing device 120 for playing the game.

FIG. 3B illustrates a block diagram 300B of a first particular architecture 310A (illustrated in dashed box) for interacting with computing device 120, according to an embodiment of the invention. In the illustrated embodiment, computing device 120 may be configured as a networked server device that facilitates online gameplay between one or more users. A particular user or group of users may play the game via primary client device 140 and send or receive individualized audio via secondary client device 150. One or more primary client devices 140 and one or more secondary client devices 150 may have a wireless or wired connection to one or more routers 304 as well. Router 304 may be communicably coupled with computing device 120 via a network 302, which may include one or more networks described herein such as the Internet. Primary client device 150 may include one or more input devices 220 and one or more display devices 230 for displaying the game space.

FIG. 3C illustrates a block diagram 300C of a second particular architecture 310B for interacting with a computing device 120, according to an embodiment of the invention. The configuration and architecture 310B is similar to architecture 310A. However, instead of using the same communication channel over network 302 as primary client device 140, secondary client device 150 may use a separate network connection, such as a cellular communications network 306. As illustrated, router 304 is omitted for clarity, although primary client device 140 may connect to network 302 via a router.

Figure 4A:
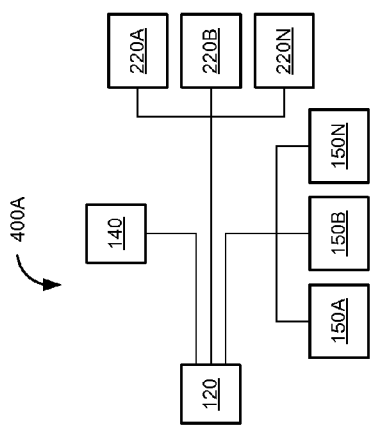
FIG. 4A illustrates a block diagram of an example of a computing device locally coupled to a primary client device, one or more input devices, and one or more secondary client devices, according to an embodiment of the invention.

FIG. 4A illustrates a block diagram 400A of an example of a computing device 120 locally coupled to one or more primary client devices 140, one or more input devices 220, and one or more secondary client devices 150, according to an embodiment of the invention. In this embodiment, primary client device 140 may include a standalone display device such as a monitor or television set. Computing device 120 may provide video and/or audio signals related to the game for displaying on primary client device 140. One or more users may use a respective user input device 220 to interact with the game space displayed by primary client device 140 (which may, for example, be shared among different users in the same room) and a respective secondary client device 150 for sending or receiving individualized audio.

Figure 4B:
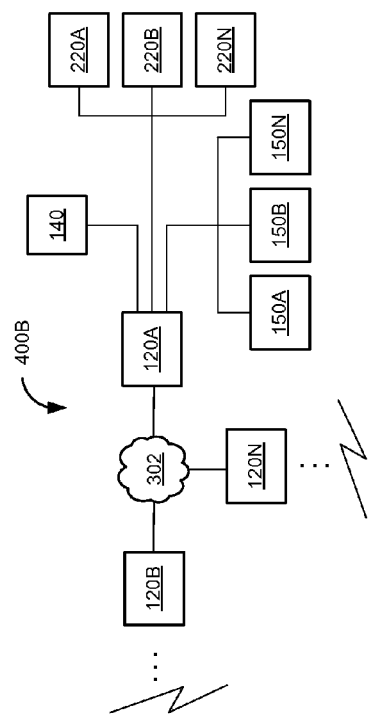
FIG. 4B illustrates a block diagram of an example of computing devices coupled to one another over a network and individually being locally coupled to a primary client device, one or more input devices, and one or more secondary client devices, according to an embodiment of the invention.

FIG. 4B illustrates a block diagram 400B of an example of computing devices 120 coupled to one another over a network 302 and individually being locally coupled to a primary client device 140, one or more input devices 220, and one or more secondary client devices 150, according to an embodiment of the invention. The configuration illustrated in block diagram 400B is similar to the configuration illustrated in block diagram 400A. However, a computing device 120 may be communicably coupled to one or more other computing devices 120 over network 302. For example, as illustrated, computing device 120A may be coupled to computing devices 120B, 120N, which may each have similar configurations of components (omitted from FIG. 4A for convenience and indicated by ellipses) as computing device 120A. In this configuration, computing devices 120 may form peer-to-peer or other network connections that may be mediated by a server device (not illustrated in FIG. 4A).

FIGS. 5A and 5B illustrate examples of configurations 500A and 500B of secondary client devices 150 in relation to a primary client device, according to an embodiment of the invention. The configurations and numbers of primary client devices and/or secondary client devices may be added, updated, and removed by device configuration module 132. In some embodiments, device configuration module 132 may automatically detect at least some of the position information and/or numbers of the devices using conventional indoor and/or outdoor location techniques. In some embodiments, device configuration module 132 may expose a user interface such that a user may configure the position information and/or numbers of devices.

As illustrated, in configuration 500A, secondary client device 150A is a distance "A1" from primary client device 140 and at a first position, secondary client device 150B is a distance "B1" from primary client device 140 and at a second position, and secondary client device 150N is a distance "C1" from primary client device 140 and at a third position. As illustrated, in configuration 500B, secondary client device 150A is a distance "A2" from primary client device 140 and at a fourth position and secondary client device 150N is a distance "C1" from primary client device 140 and at a fifth position.

In some embodiments, individualized audio may be provided to secondary client devices 150 based on the configurations 500A, 500B, and/or other configurations.

In some embodiments, each secondary client device 150 may receive individualized audio in the form of distinct audio channels. For example, a game or other media may produce two (e.g., stereoscopic channels) or more channels of audio. Each secondary client device 150 may be provided with its own set of audio channels (having different audio).

In some embodiments, the number of secondary client devices 150 may be used to determine individualized audio. For example, the number of secondary client devices may be used to determine a number of distinct audio channels that may be provided through secondary client devices 150. For example, at least three distinct audio channels may be provided via the secondary client devices in configuration 500A while at least two distinct audio channels may be provided via the secondary client devices in configuration 500B. In some embodiments where the number of audio channels that can be provided outnumber the number of secondary client devices 150 available to receive individualized audio, at least some of the remaining audio channels may be combined together or omitted.

In some embodiments, the positioning of the secondary client devices 150 may be used to determine individualized audio. For example, the positioning of secondary client devices 150 may be used to determine which secondary client device 150 should receive certain audio channels. In a particular example, secondary client devices 150 that are at the edges of the configuration 500 may receive audio channels carrying background audio while secondary client devices 150 that are more centrally located within the configuration 500 may receive audio channels carrying main audio.

In some embodiments, the distance of the secondary client devices 150 to a primary client device 140 (or other reference device) may be used to determine individualized audio. For example, the distance may be used to determine an audio characteristic (e.g., amplitude, frequency, etc.) of the audio.

In operation, the configurations 500 may be used to determine individualized audio for users playing a game and/or viewing media with individualized audio. As a non-limiting example, different users may use their respective mobile devices to play a game having multi-channel audio and/or view other media having multi-channel audio. A user may alter the configurations (e.g., number, position, distance, etc.) of the mobile devices in order to optimize the audio experience based on available configurations.

Figure 6:
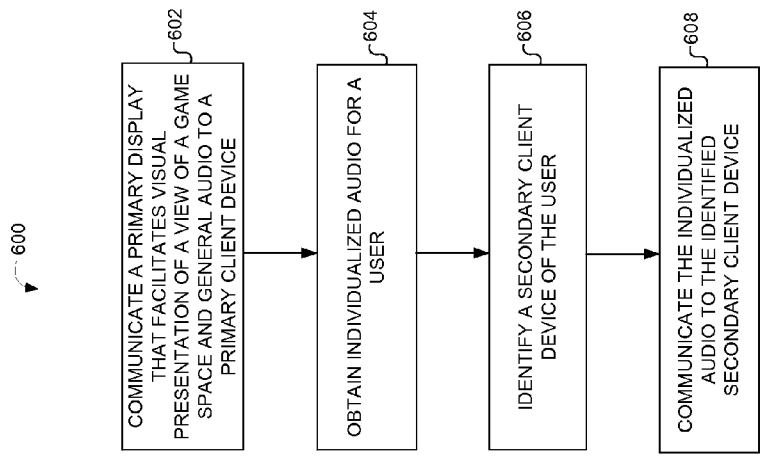
FIG. 6 illustrates a flowchart of a process for facilitating a multi-user game and communicating individualized audio intended for particular users during the game to mobile devices associated with the particular users, according to an embodiment of the invention.

FIG. 6 illustrates a flowchart of a process for facilitating a multi-user game and communicating individualized audio intended for particular users during the game to mobile devices associated with the particular users, according to an embodiment of the invention. The various processing operations and/or data flows depicted in FIG. 6 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 602, a primary display that includes information that facilitates visual presentation of a view of a game space and general audio of a multi-user game may be communicated to a primary client device. In an operation 604, individualized audio for a user may be obtained. The individualized audio may be specific for a particular user, in which case the identity of the user may also be obtained. The individualized audio may include audio tracks, voice communications (e.g., verbal utterances from a user to another user), and/or other sounds intended for a particular user and/or group of users.

In an operation 606, a secondary client device of the user may be identified. The secondary client device may include, for example, a mobile device of the user. In an operation 608, the individualized audio may be communicated to the identified secondary client device.

Although described with respect to video games, the disclosure may be used in other contexts in which general audio may be provided at a primary client device and individualized audio may be communicated via a secondary client device. Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for facilitating gameplay of a multi-user game through a primary client device and individualized audio related to the game for a particular user through a mobile device that is separate from the primary client device, the system comprising:
one or more processors configured by machine-readable instructions to:
provide to the primary client device:
information facilitating visual presentation of a view of the game space on the primary client device, the view forming a multi-user graphical user interface through which multiple users present at the primary client device input game commands, and
general audio related to the view of the game space, the general audio being intended for the multiple users present at the primary client device, the multiple users including a first user and a second user; and
obtain identifications of individual ones of the multiple users present at the primary client device,
obtain individualized audio specifically intended for individual ones of the users present at the primary client device, such individualized audio including first individualized audio intended for the first user and second individualized audio intended for the second user,
identify a first mobile device of the first user and a second mobile device of the second user, and
communicate the individualized audio to the mobile device of the users present at the primary client device such that the first individualized audio is communicated to the first mobile device for play on the first mobile device concomitant with participation by the first user in the game space through the primary client device such that both the first individualized audio and the general audio are presented to the first user, and the second individualized audio is communicated to the second mobile device for play on the second mobile device concomitant with participation by the second user in the game space through the primary client device such that both the second individualized audio and the general audio are presented to the second user.

2. The system of claim 1, wherein the first individualized audio comprises a voice communication specifically intended for the first user.

3. The system of claim 2, wherein the one or more processors are further configured by machine-readable instructions to obtain the voice communication from the second user.

4. The system of claim 3, wherein the one or more processors are further configured by machine-readable instructions to obtain the voice communication from the second user via the second mobile device of the second user via a communication channel also used by the second mobile device for non-gaming voice communication.

5. The system of claim 1, wherein the first individualized audio comprises game-related audio specifically intended for the first user.

6. The system of claim 1, wherein the one or more processors are configured by machine-readable instructions to identify the first mobile device of the user via a registration of the first mobile device during a logon process in which the system logs on the first user for gameplay on the primary client device.

7. The system of claim 1, wherein the one or more processors are further configured by machine-readable instructions to obtain the first individualized audio specifically intended for the first user based on the first user being a member of a team of users, wherein the first individualized audio is specifically intended for at least some members of the team of users.

8. The system of claim 7, wherein the first individualized audio is specifically intended for only particular members of the team of users.

9. The system of claim 1, wherein the one or more processors are further configured by machine-readable instructions to provide information facilitating visual presentation of individualized views of game information pertaining to the game space to the multiple users present at the primary client device, such information including:
   first information facilitating visual presentation of a first individualized view of game information pertaining to the game space on the first client device; and
   second information facilitating visual presentation of a second individualized view of game information pertaining to the game space on the second client device.

10. A computer-implemented method for facilitating gameplay of a multi-user game through a primary client device and individualized audio related to the game for a particular user through a mobile device that is separate from the primary client device, the method being implemented in a computer that includes one or more processors configured by machine-readable instructions, the method comprising:
   Providing, by the one or more processors, to the primary client device:
      information facilitating visual presentation of a view of the game space on the primary client device, the view forming a multi-user graphical user interface through which multiple users present at the primary client device input game commands, and
      general audio related to the view of the game space, the general audio being intended for the multiple users present at the primary client device, the multiple users including a first user and a second user;
   obtaining, by the one or more processors, identifications of individual ones of the multiple users present at the primary client device;
   obtaining, by the one or more processors, individualized audio specifically intended for individual ones of the users present at the primary client device, such individualized audio including first individualized audio intended for the first user and second individualized audio intended for the second user;
   identifying, by the one or more processors, a first mobile device of the first user and a second mobile device of the second user, and
   communicating, by the one or more processors, the individualized audio to the mobile device of the users present at the primary client device such that the first individualized audio is communicated to the first mobile device for play on the first mobile device concomitant with participation by the first user in the game space through the primary client device such that both the first individualized audio and the general audio are presented to the first user, and the second individualized audio is communicated to the second mobile device for play on the second mobile device concomitant with participation by the second user in the game space through the primary client device such that both the second individualized audio and the general audio are presented to the second user.

11. The method of claim 10, wherein the first individualized audio comprises a voice communication specifically intended for the first user.

12. The method of claim 11, wherein the one or more processors are further configured by machine-readable instructions to obtain the voice communication from the second user.

13. The method of claim 12, the method further comprising:
   obtaining, by the one or more processors, the voice communication from the second user via the second mobile device of the second user via a communication channel also used by the second mobile device for non-gaming voice communication.

14. The method of claim 10, wherein the first individualized audio comprises game-related audio specifically intended for the first user.

15. The method of claim 10, the method further comprising:
   identifying, by the one or more processors, the first mobile device of the user via a registration of the first mobile device during a logon process in which the system logs on the first user for gameplay on the primary client device.

16. The method of claim 10, the method further comprising:
   obtaining, by the one or more processors, the first individualized audio specifically intended for the first user based on the first user being a member of a team of users, wherein the first individualized audio is specifically intended for at least some members of the team of users.

17. The method of claim 16, wherein the first individualized audio is specifically intended for only particular members of the team of users.

18. The method of claim 16, the method further comprising:
   providing, by the one or more processors, an individualized view for visual presentation of an aspect of the game intended for the user to the mobile device of the user.

* * * * *